United States Patent
Watfa

(10) Patent No.: US 11,889,456 B2
(45) Date of Patent: Jan. 30, 2024

(54) NETWORK SLICE-SPECIFIC AUTHENTICATION AND AUTHORIZATION

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 17/216,445

(22) Filed: Mar. 29, 2021

(65) Prior Publication Data

US 2021/0306972 A1    Sep. 30, 2021

(30) Foreign Application Priority Data

Mar. 30, 2020  (GB) ..................................... 2004657

(51) Int. Cl.
| | |
|---|---|
| *H04W 60/04* | (2009.01) |
| *H04W 12/06* | (2021.01) |
| *H04W 12/08* | (2021.01) |
| *H04W 48/08* | (2009.01) |
| *H04W 48/18* | (2009.01) |

(52) U.S. Cl.
CPC ........... *H04W 60/04* (2013.01); *H04W 12/06* (2013.01); *H04W 12/08* (2013.01); *H04W 48/18* (2013.01)

(58) Field of Classification Search
CPC ..... H04W 60/04; H04W 12/06; H04W 12/08; H04W 48/18; H04W 12/61; H04W 76/18; H04W 8/22; H04W 60/00; H04W 76/10
See application file for complete search history.

(56) References Cited

U.S. PATENT DOCUMENTS

| | | | |
|---|---|---|---|
| 11,388,661 B2 * | 7/2022 | Ramle | ................... H04W 60/04 |
| 2017/0367036 A1 | 12/2017 | Chen et al. | |

(Continued)

FOREIGN PATENT DOCUMENTS

| | | |
|---|---|---|
| KR | 10-2019-0018707 A | 2/2019 |
| WO | 2019/160390 A1 | 8/2019 |

OTHER PUBLICATIONS

"3rd Generation Partnership Project; Technical Specification Group Services and System Aspects; System architecture for the 5G System (5GS); Stage 2 (Release 16)", 3GPP TS 23.501 V16.3.0 (Dec. 2019), 417 pages.

(Continued)

*Primary Examiner* — Brandon J Miller

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method, for a user equipment (UE) is disclosed. The method comprises: transmitting, by the UE to a network entity, a registration request message including a registration type information element (IE) indicating a periodic registration updating or a mobility registration updating; receiving, by the UE from the network entity, a registration accept message including a pending network slice selection assistant information (NSSAI); and determining, by the UE, that a previously received allowed NSSAI as invalid based on the registration accept message.

20 Claims, 3 Drawing Sheets

| 8 | 7 | 6 | 5 | 4 | 3 | 2 | 1 | |
|---|---|---|---|---|---|---|---|---|
| S-NSSAI IEI |||||||| OCTET 1 |
| LENGTH OF S-NSSAI CONTENTS |||||||| OCTET 2 |
| SST |||||||| OCTET 3 |
| SD |||||||| OCTET 4* |
| |||||||| OCTET 6* |
| MAPPED HPLMN SST |||||||| OCTET 7* |
| MAPPED HPLMN SD |||||||| OCTET 8* |
| |||||||| OCTET 10* |

(56) References Cited

U.S. PATENT DOCUMENTS

| | | | |
|---|---|---|---|
| 2019/0053148 A1 | 2/2019 | Lee et al. | |
| 2019/0306823 A1* | 10/2019 | Babu | H04W 60/04 |
| 2019/0342761 A1* | 11/2019 | Yu | H04W 8/18 |
| 2019/0357129 A1 | 11/2019 | Park et al. | |
| 2020/0162919 A1* | 5/2020 | Velev | H04W 12/084 |
| 2020/0267784 A1* | 8/2020 | Bharatia | H04L 65/80 |
| 2020/0323020 A1* | 10/2020 | Liu | H04L 69/322 |
| 2020/0413241 A1 | 12/2020 | Park et al. | |
| 2021/0250890 A1* | 8/2021 | Won | H04W 76/11 |
| 2022/0078871 A1* | 3/2022 | Won | H04W 76/19 |

OTHER PUBLICATIONS

"3rd Generation Partnership Project; Technical Specification Group Services and System Aspects; Procedures for the 5G System (5GS); Stage 2 (Release 16)", 3GPP TS 23.502 V16.3.0 (Dec. 2019), 558 pages.

3GPP TS 24.501 V16.3.0 (Dec. 2019), 645 pages.

Combined Search and Examination Report dated Sep. 1, 2020, in connection with United Kingdom Application No. GB2004657.9, 6 pages.

European Search Report dated May 20, 2021, in connection with European Patent Application No. 21165597.2, 8 pages.

Qualcomm Incorporated, "NSSAI Handling in Roaming Cases", 3GPP TSG-CT WG1 Meeting #121, C1-198077, Reno (NV), USA, Nov. 11-15, 2019, 26 pages.

NEC, "Preventing UE waiting for completion of NSSAA indefinitely—Atl2UE timer", 3GPP TSG-CT WG1 Meeting #120, C1-196443, Portoroz (Slovenia), Oct. 7-11, 2019, 41 pages.

Samsung, "Discussion on eNS", 3GPP TSG CT WG1 Meeting #122-e, Electronic meeting, Feb. 20-28, 2020, C1-200601, 4 pages.

International Search Report and Written Opinion of the International Searching Authority in connection with International Application No. PCT/KR2021/003846 dated Jul. 2, 2021, 7 pages.

3GPP TS 24.501 V16.4.0 (Mar. 2020), 3rd Generation Partnership Project; Technical Specification Group Core Network and Terminals; Non-Access-Stratum (NAS) protocol for 5G System (5GS); Stage 3 (Release 16), 666 pages.

Ericsson, "AMF awareness of emergency Registration/PDU Session at inter-CN node change", 3GPP TSG-SA2 Meeting #137E, Feb. 24-27, 2020, Electronic Meeting, S2-2001882 (revision of S2-2000290), 22 pages.

Search and Examination Report dated Oct. 17, 2023, in connection with United Kingdom Patent Application No. 2305496.8, 4 pages.

Communication pursuant to Article 94(3) EPC dated Oct. 18, 2023, in connection with European Patent Application No. 21165597.2, 7 pages.

\* cited by examiner

| 8 | 7 | 6 | 5 | 4 | 3 | 2 | 1 | |
|---|---|---|---|---|---|---|---|---|
| S-NSSAI IEI ||||||||  OCTET 1 |
| LENGTH OF S-NSSAI CONTENTS |||||||| OCTET 2 |
| SST |||||||| OCTET 3 |
| SD |||||||| OCTET 4* – OCTET 6* |
| MAPPED HPLMN SST |||||||| OCTET 7* |
| MAPPED HPLMN SD |||||||| OCTET 8* – OCTET 10* |

FIG.1

| 8 | 7 | 6 | 5 | 4 | 3 | 2 | 1 | |
|---|---|---|---|---|---|---|---|---|
| V1-CARS |||||||| OCTET 3 |
| V1-BMW |||||||| OCTET 4* – OCTET 6* |
| H1-CARS |||||||| OCTET 7* |
| H1-BMW |||||||| OCTET 8* – OCTET 10* |

FIG.2

|   8   |   7   |   6   |   5   |   4   |   3   |   2   |   1   |   |
|---|---|---|---|---|---|---|---|---|
| NSSAI IEI |||||||| OCTET 1 |
| LENGTH OF NSSAI CONTENTS |||||||| OCTET 2 |
| S-NSSAI VALUE 1 |||||||| OCTET 3 — OCTET M |
| S-NSSAI VALUE 2 |||||||| OCTET M+1* — OCTET N* |
| ... |||||||| OCTET N+1* — OCTET U* |
| S-NSSAI VALUE N |||||||| OCTET U+1* — OCTET V* |

FIG.3

|   8   |   7   |   6   |   5   |   4   |   3   |   2   |   1   |   |
|---|---|---|---|---|---|---|---|---|
| MAPPED NSSAI IEI |||||||| OCTET 1 |
| LENGTH OF MAPPED NSSAI CONTENTS |||||||| OCTET 2 |
| MAPPED S-NSSAI CONTENT 1 |||||||| OCTET 3 — OCTET M |
| MAPPED S-NSSAI CONTENT 2 |||||||| OCTET M+1* — OCTET N* |
| ... |||||||| OCTET N+1* — OCTET U* |
| MAPPED S-NSSAI CONTENT N |||||||| OCTET U+1* — OCTET V* |

FIG.4

| 8 | 7 | 6 | 5 | 4 | 3 | 2 | 1 | |
|---|---|---|---|---|---|---|---|---|
| LENGTH OF MAPPED S-NSSAI CONTENT ||||||||OCTET 3 |
| MAPPED HPLMN SST ||||||||OCTET 4 |
| MAPPED HPLMN SD ||||||||OCTET 5*<br>OCTET 7* |

NETWORK SLICE-SPECIFIC AUTHENTICATION AND AUTHORIZATION

CROSS-REFERENCE TO RELATED APPLICATION

This application is based on and claims priority under 35 U.S.C. § 119(a) to Great Britain Patent Application No. 2004657.9 filed on Mar. 30, 2020 in the Great Britain Patent Office, the disclosure of which is incorporated by reference herein in its entirety.

BACKGROUND

1. Field

Certain examples of the present disclosure provide methods, apparatus and systems for performing network slice-specific authentication and authorization. For example, certain examples of the present disclosure provide methods, apparatus and systems for enabling correct operations for network slice-specific authentication and authorization in 3GPP 5G.

2. Description of the Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Herein, the following documents are referenced: [1] 3GPP TS 23.501 V16.4.0; [2]3GPP TS 23.502 V16.4.0; and [3] 3GPP TS 24.501 V16.4.0.

In 3GPP 5G system, the following are defined (e.g., in [1]). A network slice (NS) is defined as a logical network that provides specific network capabilities and network characteristics. A network slice instance (NSI) is defined as a set of network function instances and the required resources (e.g., compute, storage, and networking resources) which form a deployed NS. A network function (NF) is defined as a 3GPP adopted or 3GPP defined processing function in a network, which has defined functional behaviour and 3GPP defined interfaces. ANS may be identified by single network slice selection assistance information (S-NSSAI).

Overview of Network Slice-Specific Authentication and Authorization (NSSAA)

NSSAA was introduced as part of Rel-16 in 3GPP. The feature enables the network to perform slice-specific authentication and authorization for a set of S-NSSAI(s) to ensure that the user is allowed to access these slices. The procedure is executed after the 5G mobility management (5GMM) authentication procedure has been completed and also after the registration procedure completes. The high-level description of the feature can be found in [1] whereas further details can be found in [2] and [3]. The key points about the NSSAA procedure are summarized in this section.

The NSSAA procedure is access independent i.e., if a slice is successfully authorized, then it is considered as authorized for both access types (i.e., 3GPP and non-3GPP access type). The term "authorized" means that slice-specific authentication/authorization has succeeded for a particular S-NSSAI, however this does not mean that the S-NSSAI is allowed to be used in the UE's current tracking area (TA) over the 3GPP access.

When the UE registers with the network, the UE may include a requested NSSAI (R-NSSAI) in the registration request message if available at the UE. The following describes the network behaviour as specified in [3]:

If the UE indicated the support for network slice-specific authentication and authorization, and:
a) if the requested NSSAI IE only includes the S-NSSAIs:
   1) which are subject to network slice-specific authentication and authorization; and
   2) for which the network slice-specific authentication and authorization procedure has not been initiated;
   the AMF may in the REGISTRATION ACCEPT message include:
   1) the "NSSAA to be performed" indicator in the 5GS registration result IE set to indicate whether network slice-specific authentication and authorization procedure will be performed by the network;
   2) pending NSSAI containing one or more S-NSSAIs for which network slice-specific authentication and authorization will be performed; and
   3) the current registration area in the list of "non-allowed tracking areas" in the service area list IE; or
b) if the requested NSSAI IE includes one or more S-NSSAIs subject to network slice-specific authentication and authorization, the AMF may in the REGISTRATION ACCEPT message include:
   1) the allowed NSSAI containing the S-NSSAIs or the mapped S-NSSAIs which are not subject to network slice-specific authentication and authorization or for which the network slice-specific authentication and authorization has been successfully performed; and
   2) pending NSSAI containing one or more S-NSSAIs for which network slice-specific authentication and authorization will be performed, if any.

If the UE indicated the support for network slice-specific authentication and authorization, and if:
a) the UE did not include the requested NSSAI in the REGISTRATION REQUEST message or none of the S-NSSAIs in the requested NSSAI in the REGISTRATION REQUEST message are present in the subscribed S-NSSAIs; and
b) all of the S-NSSAIs in the subscribed S-NSSAIs are subject to network slice-specific authentication and authorization;

the AMF may in the REGISTRATION ACCEPT message include:
- a) the "NSSAA to be performed" indicator in the 5GS registration result IE to indicate whether network slice-specific authentication and authorization procedure will be performed by the network;
- b) pending NSSAI containing one or more S-NSSAIs for which network slice-specific authentication and authorization will be performed; and
- c) the current registration area in the list of "non-allowed tracking areas" in the service area list IE.

NSSAA can be re-initiated at any time as specified in section 5.15.10 of [1]:

This procedure can be invoked for a supporting UE by an AMF at any time, e.g., when:
- a. The UE registers with the AMF and one of the S-NSSAIs of the HPLMN which maps to an S-NSSAI in the requested NSSAI is requiring network slice-specific authentication and authorization (see clause 5.15.5.2.1 for details), and can be added to the allowed NSSAI by the AMF once the network slice-specific authentication and authorization for the S-NSSAI succeeds; or
- b. The network slice-specific AAA Server triggers a UE re-authentication and re-authorization for an S-NSSAI; or
- c. The AMF, based on operator policy or a subscription change, decides to initiate the network slice-specific authentication and authorization procedure for a certain S-NSSAI which was previously authorized.

In the case of re-authentication and re-authorization (b. and c. above) the following applies:

If S-NSSAIs that are requiring network slice-specific authentication and authorization are included in the allowed NSSAI for each Access Type, AMF selects an access Type to be used to perform the network slice specific authentication and authorization procedure based on network policies.

If the network slice-specific authentication and authorization for some S-NSSAIs in the allowed NSSAI is unsuccessful, the AMF may update the allowed NSSAI for each access type to the UE via UE configuration update procedure.

If the network slice-specific authentication and authorization fails for all S-NSSAIs in the allowed NSSAI, the AMF may execute the network-initiated deregistration procedure described in TS 23.502 [2], clause 4.2.2.3.3, and may include in the explicit de-registration request message the list of rejected S-NSSAIs, each of them with the appropriate rejection cause value.

Overview of S-NSSAI IE and its Handling During Roaming

The S-NSSAI IE is coded as shown in FIG. 1.

When the UE is in the home PLMN (HPLMN) then the mapped HPLMN SST (octet 7) and mapped HPLMN SD (octets 8 to 10) are not applicable. In fact in the HPLMN these octets correspond to the SST field (octet 3) and SD field (octets 4 to 6) respectively.

On the other hand, when the UE is roaming in a visited PLMN (VPLMN) then the UE may contain the mapped slice information that corresponds to the slice being use in the VPLMN. For example, assume in a VPLMN 1 the UE has the following S-NSSAI entry in the allowed NSSAI as shown in FIG. 2.

Basically, the above means that the slice [V1-Cars, V1-BMW] that is being accessed in VPLMN 1 corresponds to the slice [H1-Cars, H1-BMW] in the HPLMN. It may be noted, as shown in FIG. 1, that the SD field and the mapped HPLMN SD fields are optional.

The network slice selection assistance information (NSSAI) is a list of single-NSSAI (S-NSSAL) and there are different types of NSSAIs such as the requested NSSAI (which has at most 8 entries), allowed NSSAI (which has at most 8 entries), configured NSSAI (which has at most 16 entries), and the pending NSSAI (which has at most 8 entries).

The NSSAI IE is coded as shown in FIG. 3.

The requested mapped NSSAI is a type of mapped NSSAI which is coded as shown in FIG. 4.

The mapped NSSAI contains a list of mapped S-NSSAI entries, where each mapped S-NSSAI entry is coded as shown in FIG. 5.

The requested mapped NSSAI IE is sent in roaming cases when:
- the UE moves across visited PLMNs and attempts to transfer a protocol data unit (PDU) session across these visited PLMNs,
- the UE has an established PDU session in the source VPLMN,
- the UE knows the mapped HPLMN slice information (i.e., the mapped HPLMN SST and optionally the mapped HPLMN SD) of the PDU session that is established in the source VPLMN, and
- the UE does not have any slice information (i.e., does not have a configured NSSAI or allowed NSSAI) for the target VPLMN.

As an example to explain this, assume the UE is in VPLMN 1 and has a PDU session for which the S-NSSAI is {V1-Cars, H-Cars}. For simplicity, the value V-Cars corresponds to at least the SST field of FIG. 1 but may also include the SD field of FIG. 1. Similarly, for simplicity the value H-Cars corresponds to at least the mapped HPLMN SST field of FIG. 1 but may also include the mapped HPLMN SD field of FIG. 1.

Now if the UE moves from VPLMN 1 to a target VPLMN, say VPLMN 2, and the UE does not have any slice information for VPLMN 2, then the UE may include the requested mapped NSSAI IE in the registration request message that is sent in VPLMN 2. The non access stratum (NAS) message does not include the requested NSSAI IE in this case since the UE does not have any slice information for VPLMN 2.

Now assume that the UE in VPLMN 1 had two PDU sessions each of which is associated to one of the following S-NSSAIs:
- {V1-Cars, H-Cars}; and
- {V1-SmartPhone, H-SmartPhone}

Also, assume that the UE has the following slice information for a potential target VPLMN 2:
- {V2-Cars, H-Cars}

When the UE enters VPLMN 2, the UE may include the following IEs in the registration request message:
- The requested NSSAI IE that may include the entry {V2-Cars, H-Cars}. This IE may be sent since the UE has the slice information for VPLMN 2 and moreover the mapped slice component i.e., the value "H-Cars," matches the mapped slice component of the existing PDU session, and
- The requested mapped NSSAI IE that may include the entry {H-SmartPhone}. This IE may be included since the UE does not have slice information for the VPLMN 2 that matches the mapped slice component i.e., the value "H-SmartPhone," of the existing PDU session.

In the example above, the AMF may consider both the requested NSSAI IE and the requested mapped NSSAI IE for the purpose of sending an allowed NSSAI IE to the UE in the registration accept message.

Note that if, for the sake of an example and for the sake of clarifying how slicing works, the UE also had {V2-SmartPhone, H-SmartPhone} as a slice information for the VPLMN 2, then the UE in this case would only include the requested NSSAI IE in the registration request message since the mapped slice information of the existing PDU sessions from VPLMN 1 match the mapped slice information of VPLMN 2. In this case the requested mapped NSSAI IE is not included in the registration request message.

To summarize, it should be understood that in roaming cases the UE may send the requested NSSAI IE only, or the requested mapped NSSAI IE, or both the requested NSSAI IE and the requested mapped NSSAI IE in the registration request message. Determining which IE to include depends on whether the UE has slice information of the target VPLMN and whether there is a match between the mapped components of the S-NSSAIs that are associated with the existing PDU session(s) from the source VPLMN.

Finally, what is very important to note is that if the UE receives the allowed NSSAI IE in the registration accept message, and:
- the entries of the allowed NSSAI IE do not match the entire S-NSSAI of an existing PDU session, or
- the mapped slice information (i.e., the mapped HPLMN SST and optionally the mapped HPLMN SD) of the entries in the allowed NSSAI IE does not match the mapped slice information of the existing PDU session, then the UE may locally release the PDU session whose associated S-NSSAI does not match any entry in the allowed NSSAI IE as explained above. This behaviour is described in [3] as follows:
- with respect to each of the PDU session(s) active in the UE, if the allowed NSSAI contains neither:
  a) an S-NSSAI matching to the S-NSSAI of the PDU session; nor
  b) a mapped S-NSSAI matching to the mapped S-NSSAI of the PDU session;
- the UE may perform a local release of all such PDU sessions except for the persistent PDU session(s).

The above information is presented as background information only to assist with an understanding of the present disclosure. No determination has been made, and no assertion is made, as to whether any of the above may be applicable as prior art with regard to the present disclosure.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an S-NSSAI information element;
FIG. 2 illustrates an example S-NSSAI value;
FIG. 3 illustrates an NSSAI information element;
FIG. 4 illustrates a mapped NSSAI information element.

DETAILED DESCRIPTION

Figures 5, 6:
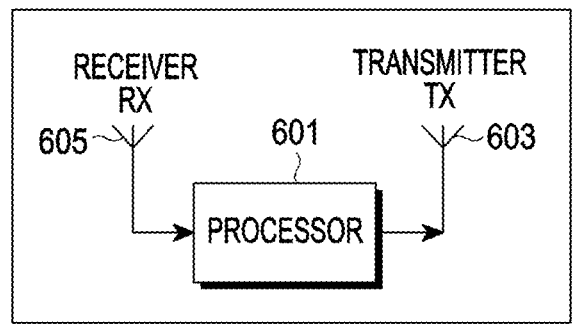
FIG. 5 illustrates a mapped S-NSSAI content.
FIG. 6 is a block diagram of an exemplary network entity that may be used in certain examples of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device:

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure.

The same or similar components may be designated by the same or similar reference numerals, although the same or similar components may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for performing network slice-specific authentication and authorization. The following examples are applicable to, and use terminology associated with, 3GPP 5G. For example, certain examples of the present disclosure provide methods, apparatus and systems for enabling correct operations for network slice-specific authentication and authorization in 3GPP 5G. However, the skilled person will appreciate that the techniques disclosed herein are not limited to these examples or to 3GPP 5G, and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of the AMF in the examples below may be applied to any other suitable type of entity performing mobility management functions.

The skilled person will appreciate that the present disclosure is not limited to the specific examples disclosed herein. For example:

The techniques disclosed herein are not limited to 3GPP 5G;

One or more entities in the examples disclosed herein may be replaced with one or more alternative entities performing equivalent or corresponding functions, processes or operations;

One or more of the messages in the examples disclosed herein may be replaced with one or more alternative messages, signals or other type of information carriers that communicate equivalent or corresponding information;

One or more further elements, entities and/or messages may be added to the examples disclosed herein;

One or more non-essential elements, entities and/or messages may be omitted in certain examples;

The functions, processes or operations of a particular entity in one example may be divided between two or more separate entities in an alternative example;

The functions, processes or operations of two or more separate entities in one example may be performed by a single entity in an alternative example;

Information carried by a particular message in one example may be carried by two or more separate messages in an alternative example;

Information carried by two or more separate messages in one example may be carried by a single message in an alternative example;

The order in which operations are performed may be modified, if possible, in alternative examples; and The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Certain examples of the present disclosure may be provided in the form of a system (e.g., a network) comprising one or more such apparatuses/devices/network entities, and/or a method therefor.

For example, in the following examples, a network may include a user equipment (UE), and an access and mobility management function (AMF) entity.

The 5G core (5GC) AMF receives all connection and session related information from the UE (N1/N2) but is responsible only for handling connection and mobility management tasks. All messages related to session management are forwarded over the N11 reference interface to the session management function (SMF). The AMF performs the role of access point to the 5GC. The functional description of AMF is given in 3GPP TS 23.501 V16.3.0, clause 6.2.1.

At least the following problems exist in view of the related art:

1. NSSAA does not Consider the Requested Mapped NSSAI IE and the UE May Incorrectly Release a PDU Session Thereby Impacting the User's Experience As described above, when the UE is roaming, the UE may include the requested NSSAI IE only, the requested mapped NSSAI IE only, or both the requested NSSAI IE and the requested mapped NSSAI IE in the registration request message.

The current NSSAA procedure does not consider UEs that are roaming and hence it is unclear what the AMF may do when the requested mapped NSSAI IE is received and how this impacts NSSAA.

In relation to roaming, as also mentioned above, when the UE receives an allowed NSSAI IE in the registration accept message for which no S-NSSAI entry of the allowed NSSAI, or no mapped S-NSSAI component of the S-NSSAI entries in the allowed NSSAI match the mapped S-NSSAI information of an existing PDU session, the UE may perform a local release of these PDU sessions. This may be incorrect behaviour that may lead to an unnecessary release of the PDU session and disruption to the user experience. For example, the allowed NSSAI may not include such an S-NSSAI that would match the slice information of an existing PDU session because the slice is subject to NSSAA. Hence, the slice information, for which there is a potential match, may be in the pending NSSAI IE and therefore considering only the allowed NSSAI IE in this case can lead to an early and incorrect release of the PDU session locally in the UE.

2. Collisions of Procedures have not been Considered

The NAS specification [3] usually considers collisions of different NAS procedures or messages and specifies which procedure or message may be prioritized in some cases depending on the colliding procedures in question. There are some collision cases that can occur during NSSAA that have not yet been considered thereby leaving the UE and network behaviour unclear when such cases arise. The following cases are identified as lacking any defined behaviour.

Case 1: A Collision of an Authentication Procedure and NSSAA Procedure

As stated above, NSSAA may occur after the authentication procedure completes. However, it is possible that the same AMF that initiates an NSSAA procedure may also initiate an authentication procedure. This is because the re-initiation of the authentication procedure can happen at any time in connected mode. For example, assume the UE is registered over one access e.g., say the 3GPP access, the UE is in connected mode, and the network is performing NSSAA. Then the UE registers over a second access, e.g., say the non-3GPP access, to the same PLMN or AMF. The AMF may have a policy to run authentication for every initial registration. In this case, although NSSAA is ongoing, the AMF may initiate the authentication procedure and send the Authentication request message to the UE. At the UE, the authentication request message may be received after (or before) a network slice-specific authentication command message is received in the UE but before the UE responds with the network slice-specific authentication complete message, then there has to be specified behaviour for the UE to follow in terms of which message needs to be prioritized. The same question can be asked for the AMF i.e., if the AMF sends the authentication request message after sending a network slice-specific authentication command message to the UE, and the AMF has not yet received the authentication response but receives the network slice-specific authentication complete message, then it is not clear if the AMF may accept the latter or wait for the authentication procedure to complete.

Case 2: A Collision of a Generic UE Configuration Update Procedure and NSSAA Procedure The generic UE configuration update procedure can be initiated at any time when the UE is in connected mode. Similarly, the NSSAA procedure can be initiated at any time for a UE that is in connected mode. As such, these procedures may collide and the related messages may be sent by the AMF at approximately the same time thereby the UE receives these messages at approximately the same time. The NAS specification [3] usually defines the behaviour for the recipient in collision cases however the current specification has not defined the behaviour for the collision of these procedures. Certain examples of the present disclosure aim to solve this problem by specifying the correct behaviour to mitigate such collisions.

Case 3: A Collision of a Service Request Procedure and NSSAA Procedure

The UE can initiate the service request procedure when in connected mode. At the same time, the network may initiate NSSAA for the UE in connected mode. For example, the UE can be in 5GMM-CONNECTED mode over the non-3GPP access and then the UE performs a registration procedure over the 3GPP access. The AMF may indicate that NSSAA may be performed in the 5GS registration result IE and may include the pending NSSAI IE in the registration accept message but the AMF may not include the allowed NSSAI IE in the NAS message. At the same time, or approximately the same time, the UE may send the service request message over the non-3GPP access although the existing requirement is such that this may not happen. There is currently no mechanism to handle this collision.

3. Lack of Methods to Handle Abnormal Cases

The NAS specification [3] handles abnormal cases that can occur and describes a method for recovering from them.

Case 1: Transmission Failure of the Network Slice-Specific Authentication Complete Message with TAI Change from Lower Layers The following abnormal case has been identified for NSSAA in section 5.4.7.2.4 in [3]:

a) Transmission failure of the NETWORK SLICE-SPECIFIC AUTHENTICATION COMPLETE message with TAI change from lower layers If the current TAI is not in the TAI list, the network slice-specific authentication and authorization procedure may be aborted and a registration procedure for mobility and periodic registration update indicating "mobility registration updating" in the 5GS registration type IE of the REGISTRATION REQUEST message may be initiated.

If the current TAI is still part of the TAI list, it is up to the UE implementation how to re-run the ongoing procedure that triggered the network slice-specific authentication and authorization procedure.

The case above means that the UE, during an ongoing NSSAA enters a new tracking area identity (TAI) that is not in the UE's current list of TAIs and therefore the UE would need to perform a registration procedure again.

Although the behaviour above is fine, what is not yet considered is how the UE handles the requested NSSAI IE that may be sent in the registration request procedure.

It may be noted that there is a requirement that the UE with a pending NSSAI may not include the S-NSSAIs in the pending NSSAI if the UE sends a registration request again except when specific conditions occur. However, before entering a new TAI as described above, the UE may have received a pending NSSAI IE but no allowed NSSAI IE, or the UE may have received both IEs. In any cases, as the UE is moving into a new TAI, this new area may be served by a new AMF. Therefore, if the UE does not send the requested NSSAI IE again, then the determination (by the AMF) of the entries of the allowed NSSAI IE would be different as compared to the case when the UE actually sends a requested NSSAI IE. Hence, not sending the requested NSSAI IE may be led to an incorrect behaviour and undesirable outcome. The present disclosure analyses different cases to determine whether or not the requested NSSAI IE may be included in the registration request message following the abnormal case in an effort to avoid undesirable outcomes.

Case 2: NSSAA Performed for an S-NSSAI that is in the Allowed NSSAI List or is not in the Pending NSSAI The UE may register with the network e.g., at initial registration, and get an allowed NSSAI with an S-NSSAI entry, say for example S-NSSAI X. The network may also provide a pending NSSAI list in the registration accept message for which NSSAA is to be performed.

The UE may then receive the network slice-specific authentication complete message for an S-NSSAI, say S-NSSAI X, that is already in the allowed NSSAI list in the UE or is not in the pending NSSAI list in the UE. This is an abnormal case and the UE behaviour has not yet been defined to handle such a scenario.

Case 3: Unnecessary Release of a NAS Connection

To avoid the unnecessarily maintenance of a NAS connection, the UE starts the timer T3540 in some cases to guard a maximum period of time during which the network is expected to release the NAS signalling connection. The cases for which the UE starts T3540 are described in section 5.3.1.3 of the NAS specification in [3].

However, the current conditions for the start of T3540 (which when expires may lead to the local release of the NAS connection in the UE), specifically associated with the registration procedure, are not complete and hence need to be updated. Otherwise, the NAS connection may be released earlier than needed.

4. Issue with Prohibiting the Service Request Procedure During NSSAA

The AMF may indicate that NSSAA is pending by including the "NSSAA to be performed" indicator in the 5GS registration result IE and the AMF may include the pending NSSAI IE without including the allowed NSSAI IE in the registration accept message. In this case, the UE is not allowed to perform a service request procedure except for emergency services, or high priority access, or for responding to paging or notification over non-3 GPP access.

However, the UE may be in 5GMM-CONNECTED mode over the non-3GPP access while NSSAA is ongoing. It is already an existing trigger that if the lower layer connection of the non-3 GPP access is lost, then the UE may perform a service request procedure to re-establish the NAS connection when the lower layers (of the non-3 GPP access) indicate that the connection has been regained as specified in section 5.6.1.1 of [3]:

This procedure is used when:
the UE in 5GMM-IDLE mode over non-3GPP access, receives an indication from the lower layers of non-3GPP access, that the access stratum connection is established between UE and network; or . . . .

However, the prohibition of the service request procedure due to the ongoing NSSAA leads to contradictory requirement at the UE where:
on one hand the loss of the lower layer connection requires the initiation of the service request procedure, and
on the other hands the ongoing NSSAA procedure prohibits the initiation of the service request procedure as the loss of the lower layer connection is not one of the identified exceptions for initiating the service request procedure.

5. Fallback Indication from Lower Layers and the UE has NSSAA Complete Message to Send The UE in 5GMM-CONNECTED mode may receive a fallback indication from the lower layers as described in section 5.3.1.2 of the NAS specification in [3] (reproduced below for reference):

When the UE in 5GMM-CONNECTED mode over 3GPP access receives a fallback indication from lower layers, and the UE has no pending NAS procedure and no pending uplink user data for PDU session(s) with user-plane resources already established, the UE may:
a) enter 5GMM-IDLE mode; and
b) initiate the registration procedure for mobility and periodic registration update and include the Uplink data status IE in the registration request message indicating the PDU session(s) for which user-plane resources were active prior to receiving the fallback indication, if any (see subclause 5.5.1.3 for further details).

When the UE in 5GMM-CONNECTED mode over 3GPP access receives a fallback indication from lower layers, and the UE has pending uplink user data for PDU session(s) with user-plane resources already established but no pending NAS procedure, the UE may:
a) enter 5GMM-IDLE mode; and
b) initiate the service request procedure and include the Uplink data status IE in the SERVICE REQUEST message indicating the PDU session(s) for which user-plane resources were active prior to receiving the fallback indication (see subclause 5.6.1 for further details).

When the UE in 5GMM-CONNECTED mode over 3GPP access receives a fallback indication from lower layers, and the UE has a pending registration procedure, a service request procedure, or a de-registration procedure, the UE may:
a) enter 5GMM-IDLE mode;
b) proceed with the pending procedure; and
c) if the pending procedure is a service request or registration procedure, the UE may include the Uplink data status IE in the service request message, or in the registration request message, indicating the PDU session(s) for which user-plane resources were not active prior to receiving a fallback indication from the lower layers and the UE has pending user data to be sent over 3GPP access, if any, and the PDU session(s) for which user-plane resources were active prior to receiving the fallback indication, if any (see subclauses 5.5.1.3 and 5.6.1 for further details).

When the UE in 5GMM-CONNECTED mode over 3GPP access receives a fallback indication from lower layers, and the UE has a pending NAS procedure other than a registration procedure, a service request procedure, or a de-registration procedure, the UE may:
a) enter 5GMM-IDLE mode;
b) initiate the service request procedure and include the Uplink data status IE in the service request message indicating the PDU session(s) for which user-plane resources were active prior to receiving the fallback indication, if any (see subclause 5.6.1 for further details); and
c) upon successful service request procedure completion, proceed with any pending procedure.

The cases above apply when the UE is in an allowed area or when the UE is not in a non-allowed area.

When the UE:
a) is in a non-allowed area or is not in an allowed area;
b) is in 5GMM-CONNECTED mode over 3GPP access;
c) receives a fallback indication from lower layers; and
d) does not have signalling pending, the UE may:
a) enter 5GMM-IDLE mode; and
b) initiate the registration procedure for mobility and periodic registration update. The UE may not include the Uplink data status IE in the registration request message except if the PDU session for which user-plane resources were active is an emergency PDU session, or if the UE is configured for high priority access in the selected PLMN.

In the above cases when the UE receives a fallback indication from lower layers, if the UE is in non-allowed area or not in allowed area, the UE may behave as specified in subclause 5.3.5.

A particular behaviour to note is that if the UE has a pending procedure that is not a registration procedure, not a service request procedure, and not a deregistration procedure, then after reception of a fallback indication from the lower layers the UE may initiate a service request procedure from idle mode and after the completion of the procedure the UE continues with the pending NAS procedure.

During a registration procedure, the UE may receive a pending NSSAI list in the registration accept message and the network may then start NSSAA. The UE may receive the network slice-specific authentication command message and the UE may have to respond to this message and hence the UE has a pending NAS message that is not a registration procedure, not a service request procedure, and not a deregistration procedure. The UE may then receive a fallback indication from the lower layers. Since there are some requirements that the UE may not initiate a service request procedure during NSSAA, optionally when no allowed NSSAI is available in the UE, then the recovery from fallback would contradict that requirement. The UE behaviour needs to be defined in this case such that the proper recovery from fallback can occur.

6. Handling of Timer T3346 when the UE Receives a NAS Message for NSSAA

The UE may be in 5GMM-CONNECTED mode with the NAS congestion control timer T3346 running. The UE may then receive a network slice-specific authentication command message for NSSAA. Currently, the UE does not stop the timer T3346 if it is running and this is an incorrect behaviour.

7. Impacts to NSSAA During a Registration Procedure for Periodic Updating

The UE is not mandated to send the requested NSSAI during periodic registration which means that the NSSAI information that is requested by the UE has not changed since the last signalling or registration with the network. However, if the allowed NSSAI has changed for the UE, the AMF can provide a new allowed NSSAI in the registration accept message.

Currently, the providing an allowed NSSAI and/or a pending NSSAI to the UE during a registration procedure depends on whether or not the UE sent a requested NSSAI and the contents of the requested NSSAI. For example, the UE may not have any slice information for the current PLMN and hence may not send a requested NSSAI although the registration is not triggered due to periodic registration. In this case, the AMF may consider the default slices for the UE.

However as mentioned above, since the UE does not provide a requested NSSAI during periodic registration, the AMF may consider the default slices for the UE and therefore provide the wrong allowed NSSAI. Therefore, the current procedure for NSSAA needs to consider whether or not the UE is performing a periodic registration and determine the contents of the pending NSSAA accordingly. The current handling of the registration request message currently does not consider this aspect and hence needs to be updated for a correct handling and execution of the NSSAA procedure.

In view of the above problems, certain examples of the present disclosure provide one or more of the following solutions.

1. Solution to Enable NSSAA During Roaming Cases (and Non-Roaming Cases)

As described above, the roaming UE may include the requested mapped NSSAI IE in the registration request message and the S-NSSAI(s) included in this IE may be subject to NSSAA.

Therefore, it is provided that the AMF may also consider and take into account the mapped S-NSSAI content in the requested mapped NSSAI IE for NSSAA optionally in addition to the S-NSSAI entries of the requested NSSAI IE if the latter is also included in the registration request message.

In addition to the current behaviour, the AMF may also perform the following actions:

If the UE does not support NSSAA, the UE sent the requested mapped NSSAI IE in the registration request and the S-NSSAI entries in the IE are subject to NSSAA, and optionally
   the requested NSSAI IE is not included in the registration request message, or
   the requested NSSAI IE is included in the registration request message and the entries in the requested NSSAI IE are subject to NSSAA,
then the AMF may reject the registration by sending the registration reject message and include the 5GMM cause #62 "No network slices available" and the AMF may also include the rejected NSSAI IE. In this case, the SST field of the rejected S-NSSAI may be set to the mapped HPLMN SST that was included in the requested mapped NSSAI IE, and for which NSSAA is required, and the SD field of the rejected S-NSSAI may be set to the mapped HPLMN SD field if the latter was included in the requested mapped NSSAI IE.

If the entries in the requested mapped NSSAI are not subject to NSSAA and the AMF's policy allows that these slices can be used by the UE and the associated PDU session is allowed to be transferred, then the AMF may include the corresponding S-NSSAI in the allowed NSSAI IE and send the IE to the UE in the registration accept message.

If the UE supports NSSAA and the UE included the requested mapped NSSAI IE in the registration request message for which the entries in the requested mapped NSSAI are subject to NSSAA, the AMF may include the corresponding S-NSSAIs in the pending NSSAI IE and send the IE to the UE in the registration accept message. Note that the pending NSSAI IE may also include entries from the requested NSSAI IE if the latter was included by the UE in the registration request message.

When rejecting a registration request message from the UE due to NSSAA, the AMF may also consider different cases i.e., it may consider whether the requested mapped NSSAI IE is included or the requested NSSAI IE is included in the message. The AMF behaviour is provided to be as follows:

- If the registration request message included the requested mapped NSSAI IE but did not include the requested NSSAI IE and NSSAA is revoked or failed for all the entries in the requested mapped NSSAI IE (or all the entries are rejected for the current registration area or rejected for the current PLMN), and optionally there is no entry for which the network allows the UE to use without NSSAA or there is no default S-NSSAI that is allowed for the UE, then the network may send the registration reject and include the rejected NSSAI IE. For each of the rejected S-NSSAI entry in the rejected NSSAI IE, the AMF may set the reject cause to "S-NSSAI is not available due to the failed or revoked network slice-specific authentication and authorization."
- If the registration request message included the requested mapped NSSAI IE and also the requested NSSAI IE, and NSSAA is revoked or failed for all the entries in both IEs (or all the entries are rejected for the current registration area or rejected for the current PLMN), and optionally there is no entry in any of these IEs for which the network allows the UE to use without NSSAA or there is no default S-NSSAI that is allowed for the UE, then the network may send the registration reject and include the rejected NSSAI IE. For each of the rejected S-NSSAI entry in the rejected NSSAI IE, the AMF may set the reject cause to "S-NSSAI is not available due to the failed or revoked network slice-specific authentication and authorization." The Deregistration request message may include the 5GMM cause indicating #62 "No network slices available."
- When the AMF sends the rejected NSSAI IE due to failure of NSSAA, or revocation of NSSAA, or the UE does not support NSSAA but all the S-NSSAIs that the UE requested (either in the requested mapped NSSAI IE, or in the requested NSSAI IE, or both) are subject to NSSAA, then the entries in the rejected NSSAI IE may be set to the mapped S-NSSAI (i.e., the S-NSSAI of the HPLMN). The registration reject message may include the 5GMM cause indicating #62 "No network slices available."
- Alternatively, when any of the above occurs for a UE in connected mode, i.e., when the AMF considers the contents of the requested mapped NSSAI IE and/or the contents of the requested NSSAI IE, and NSSAA fails for all the entries in the IEs, and optionally there is no default slices that are allowed for the UE, or optionally there entries in the IEs are rejected for the current PLMN or registration area, then the AMF may send the Deregistration request message and set the 5GMM cause to #62 "No network slices available." The AMF may also include the rejected NSSAI.

When NSSAA is to be performed, the UE may receive the registration accept message with a pending NSSAI IE and optionally an allowed NSSAI IE. According to current behaviour, if the UE receives the allowed NSSAI IE for which there is no match between the S-NSSAI entries and the S-NSSAI that is associated with a PDU session, or between the mapped S-NSSAI (of the allowed NSSAI entries) and the mapped S-NSSAI that is associated with a PDU session, then the UE may locally release the PDU session for which there is no match as described above.

However, during NSSAA, an S-NSSAI that is associated with a PDU session may not be in the allowed NSSAI IE but may be in the pending NSSAI IE. Therefore, the UE which supports NSSAA may not ignore the contents of the pending NSSAI IE before concluding or determining that a PDU session may be released. Therefore, it is provided that:

- If the UE receives an allowed NSSAI IE and a pending NSSAI IE, then even if there is no match between the:
  - S-NSSAIs in the allowed NSSAI IE and the S-NSSAI for each and every PDU session, or
  - mapped S-NSSAI of the entries in the allowed NSSAI IE and the mapped S-NSSAI for each and every PDU session, then the UE may check for a match, as described above i.e., between:
  - the S-NSSAI entries in the pending S-NSSAI IE and the S-NSSAI of each and every PDU session, or
  - mapped S-NSSAI of the entries in the pending NSSAI IE and the mapped S-NSSAI for each and every PDU session.

If there is a match, then the UE may not release the PDU session for which the match occurred and may wait to determine if the session may be released after NSSAA completes and after the UE gets the allowed NSSAI IE for which it may perform the check again. Optionally the UE performs the check again (e.g., on the allowed NSSAI entries) after the pending NSSAI list is empty.

If there is no match, as described above, with any entry of the pending NSSAI IE, then the UE may (for each PDU session for which a match did not occur) release the PDU session locally except for persistent PDU sessions or a PDU session for emergency services.

- If the UE does not receive the allowed NSSAI IE but receives the pending NSSAI IE, then the UE may maintain the PDU session until the allowed NSSAI IE is received after which the UE performs the check as described above and determine whether or not a PDU session may be released.

Alternatively, the UE may perform the check against the entries in the pending NSSAI IE as described above i.e., the UE checks for a match between:
  - the S-NSSAI entries in the pending S-NSSAI IE and the S-NSSAI of each and every PDU session, or
  - mapped S-NSSAI of the entries in the pending NSSAI IE and the mapped S-NSSAI for each and every PDU session.

If there is a match, the UE maintains the PDU session for which the match occurred until the allowed NSSAI IE is received after which the UE performs the check again and then determines whether or not a PDU session may be released.

If there is no match, as described above, with any entry of the pending NSSAI IE, then the UE may release the PDU session locally except for persistent PDU sessions or a PDU session for emergency services.

The provided embodiment above can also be achieved by the following checks at the UE:

With respect to each of the PDU session(s) active in the UE, if the UE does indicate support for network slice-specific authentication and authorization and:

1) if the UE received a pending NSSAI but no allowed NSSAI, and every mapped S-NSSAI in the pending NSSAI does not match with the mapped S-NSSAI of the PDU session;

2) if the UE received a pending NSSAI and an allowed NSSAI, and i) the allowed NSSAI contains neither:

A) an S-NSSAI matching to the S-NSSAI of the PDU session; nor

B) a mapped S-NSSAI matching to the mapped S-NSSAI of the PDU session; and ii) every mapped S-NSSAI in the pending NSSAI does not match with the mapped S-NSSAI of the PDU session; or 3) if the UE received an allowed NSSAI but no pending NSSAI, and the allowed NSSAI contains neither:

i) an S-NSSAI matching to the S-NSSAI of the PDU session; nor ii) a mapped S-NSSAI matching to the mapped S-NSSAI of the PDU session;

the UE may perform a local release of all such PDU sessions except for an emergency PDU session, if any.

Optionally, the UE may always maintain the PDU sessions as long as the UE has a pending NSSAI that is not empty, or optionally as long as the 5GS registration result IE indicates "NSSAA to be performed." When the UE receives an allowed NSSAI and/or rejected NSSAI such that as part of storing this information the UE's pending NSSAI becomes empty, the UE then performs the check against the allowed NSSAI (as currently specified in TS 24.501 and also described above) to determine if the session may be maintained or not. In other words, the UE maintains the PDU sessions until the UE receives an allowed NSSAI and/or the UE's pending NSSAI is empty, and then the UE checks the allowed NSSAI for a match between the:

S-NSSAIs in the allowed NSSAI IE and the S-NSSAI for each and every PDU session, or mapped S-NSSAI of the entries in the allowed NSSAI IE and the mapped S-NSSAI for each and every PDU session.

If there is no match as described above, then the UE releases the PDU session for which there is no match, except a PDU session for emergency services or high priority access.

Note that the provided embodiments above apply even for non-roaming cases i.e., even if the UE did not send the requested mapped NSSAI IE. Note that the above provided embodiments also apply for the case when the UE performs an inter-system change from S1 mode (i.e., from EPS) to N1 mode (i.e., to 5GS) and optionally when the N26 interface is supported in the system.

Moreover, the check as described above can also be made between what the UE sends in the {requested NSSAI IE or the requested mapped NSSAI IE} and the entries of {the allowed NSSAI IE or the pending NSSA IE}.

Note that some or all of the checks above (i.e., the checks in the UE to determine whether or not a PDU session may be locally released based on the received NSSAI information) may also be performed when the UE receives the same information or a subset of the information (i.e., allowed NSSAI only, or pending NSSAI only, or both allowed NSSAI and pending NSSAI) in the configuration update command message.

Note that the term "mapped S-NSSAI in the pending NSSAI" also refers to an S-NSSAI entry in the pending NSSAI.

2. Solution to Handle Collisions Between NSSAA Procedure and Other Procedures

Case 1: Solution for Collision Between an Authentication Procedure and NSSAA Procedure As described above, during NSSAA, the network may initiate an NSSAA procedure and then initiate an authentication procedure.

If the UE receives the network slice-specific authentication command message over any access type (e.g., 3GPP access or non-3GPP access) and (approximately at the same time or shortly after) the UE also receives the Authentication request message over any access type (e.g., 3GPP access or non-3GPP access), where the access type over which one of the NAS messages is not necessarily the same as the access type over which the other NAS message is received, then the UE may ignore or abort the NSSAA procedure (i.e., ignore the network slice-specific authentication command message) and continue with the authentication procedure (i.e., process the Authentication request message). Alternatively, the UE may first process the Authentication request message and first successfully complete the procedure for authentication and optionally for security mode control before responding to the network slice-specific authentication command message. In this case, the UE may only send the network slice-specific authentication complete message after sending the authentication response or security mode complete message.

Note that the provided embodiment above applies to a collision between the NSSAA procedure and a security control procedure.

Hence if the UE receives a network slice-specific authentication command message over an access type and (approximately at the same time or shortly after) the UE also receives a security mode command message over the same access type then the UE may prioritize handling the security mode command message (i.e., may prioritize the security mode control procedure) over the network slice-specific authentication command message (i.e., over the NSSAA procedure). The UE may ignore the network slice-specific authentication command message (i.e., ignore or abort the NSSAA procedure) and process the security mode command message (i.e., continue with the security mode control procedure). Alternatively, the UE may first complete the ongoing security mode control procedure and after the successful completion of the procedure (i.e., after the UE sends the Security Mode Complete message) the UE can then process the network slice-specific authentication command message and potentially respond with the network slice-specific authentication complete message.

Case 2: Solution for Collision Between a Generic UE Configuration Update Procedure and NSSAA Procedure As described above, during NSSAA, the network may initiate an NSSAA procedure and then initiate a generic UE configuration update procedure. If the UE receives the network slice-specific authentication command message over any access type (e.g., 3GPP access or non-3GPP access) and (approximately at the same time or shortly after) the UE also receives the configuration update command message over any access type (e.g., 3GPP access or non-3GPP access), where the access type over which one of the NAS messages is not necessarily the same as the access type over which the other NAS message is received, and if the configuration update command message indicates that a registration is required (e.g., with the "registration requested" bit of the configuration update indication IE or any other means that can be used to indicate that a registration is required) then the UE may ignore or abort the NSSAA procedure (i.e., ignore the network slice-specific authentication command message) and proceed with the generic UE configuration update procedure (i.e., process the configuration update command message).

Alternatively, the provided embodiment above may be applied if the configuration update command message does not contain any parameter other than the indication to register (e.g., the message contains no other IE except the configuration update indication IE).

Alternatively, the provided embodiment above may be applied if the configuration update command message indicates that a registration is required and the message also includes the Network slicing indication IE with the NSSCI bit (see [3]) set to "network slicing subscription changed."

Alternatively, the provided embodiment above may not apply, i.e., the UE continues with both the NSSAA procedure and the generic UE configuration update procedure, if the UE is requested to perform a registration while in connected mode e.g., when the MICO indication IE is present in the configuration update command message. Note that the presence of the MICO indication IE is an example of when the UE is requested to perform a registration procedure in connected mode but there can be other cases for which the UE is requested to perform a registration in connected mode and for these cases the provided embodiment above does not apply.

Note: "the provided embodiment above may not apply" means that the UE does not ignore the NSSAA procedure and the UE continues to process both the network slice-specific authentication command message and the configuration update command message and none of the procedures is aborted.

Case 3: Solution for Collision Between a Service Request Procedure and NSSAA Procedure As described above, during an ongoing NSSAA procedure e.g., over the 3GPP access, the UE may initiate the service request procedure over the non-3GPP procedure.

When the AMF receives a service request message over the non-3GPP access from a UE that is in 5GMM-CONNECTED mode over the non-3GPP access, if the:

AMF has initiated NSSAA for the UE over the same or a different access,

And optionally the AMF has sent the registration accept message (prior to the start of NSSAA) to the UE over a different access where the message contains a pending NSSAI IE and the 5GS registration result IE indicating "NSSAA to be performed," and the message does not contain the allowed NSSAI IE, And the AMF receives a service request message from the UE over the non-3GPP access, optionally from a UE that is in 5GMM-CONNECTED mode, and optionally the service request message includes the Uplink data status IE, then the AMF may abort the service request procedure (i.e., ignore the service request message) and proceed with the NSSAA procedure (i.e., send the network slice-specific authentication command message to the UE if not yet sent, or process the network slice-specific authentication complete message from the UE if received).

Otherwise, if the conditions above are not met, the AMF may process both procedures simultaneously.

3. Handling of Abnormal Cases

Case 1: Transmission Failure of the Network Slice-Specific Authentication Complete Message with TAI Change from Lower Layers As specified in [3], when the identified abnormal case occurs, the UE aborts the network slice-specific authentication and authorization procedure and a registration procedure for mobility and periodic registration update indicating "mobility registration updating" in the 5GS registration type IE of the REGISTRATION REQUEST message may be initiated. In this case, the UE may also include the requested NSSAI IE or the requested mapped NSSAI IE, or both IEs, even if the S-NSSAI entries that constitute these IEs are in the pending NSSAI IE.

Alternatively, the IEs may be included if in the previous or last registration procedure the UE had sent a requested NSSAI IE or the requested mapped NSSAI IE, or both IEs, even if the UE has a pending NSSAI list for which the S-NSSAI entries were previously included in requested NSSAI IE or the requested mapped NSSAI IE, or both IEs.

Case 2: NSSAA Performed for an S-NSSAI that is in the Allowed NSSAI List or is not in the Pending NSSAI The UE may perform a registration procedure, e.g., for initial registration, and the UE may get an allowed NSSAI in the registration accept message that may include a pending NSSAI.

After the registration procedure completes, the AMF may initiate NSSAA and send the network slice-specific authentication command message and the S-NSSAI field set to a value that is either in the allowed NSSAI or is not in the pending NSSAI. When this occurs, optionally after an initial registration, the UE may consider this as an abnormal case or an error.

When the UE considers a network slice-specific authentication command message as problematic or erroneous or as an abnormal case, such as but not limited to the example scenario discussed above, the UE may send the 5GMM status message to the AMF as defined in [3]. In this case, the UE can use a new 5GMM cause code that is indicative of an error with NSSAA e.g., "Network Slice-Specific Authorization and Authentication Error." Note that this is an example 5GMM cause code but any other value can be defined for this purpose.

Alternatively, a new 5GMM message can be used for this purpose. For example, a new Network Slice-Specific Authentication reject message can be defined to report an error or abnormal case such as the scenario described above. The new message may include at least the S-NSSAI that was received in the corresponding network slice-specific authentication command message, a 5GMM cause and optionally an EAP message. The EAP message may be the same message that was received in the corresponding network slice-specific authentication command message.

When the UE sends either the 5GMM Status message or the new NAS message as provided above, the UE may optionally send the list of allowed NSSAI and pending NSSAI to the AMF to inform the AMF of the S-NSSAIs that are available in the UE for each list. The provided new message, i.e., network slice-specific authentication message is shown in Table 1 below.

TABLE 1

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | NETWORK SLICE-SPECIFIC AUTHENTICATION RESULT message identity | Message type 9.7 | M | V | 1 |
| | S-NSSAI | S-NSSAI 9.11.2.8 | M | LV | 2-5 |
| | EAP message | EAP message 9.11.2.2 | M | LV-E | 6-1502 |
| | Allowed NSSAI | NSSAI 9.11.3.37 | O | TLV | 4-74 |
| | Pending NSSAI | NSSAI 9.11.3.37 | O | TLV | 4-74 |
| | Rejected NSSAI | Rejected NSSAI 9.11.3.46 | O | TLV | 4-42 |

Note that the IEs in the message above may be optional (identified by "O" in the Presence column) although some are shown as mandatory (identified by "M" in the Presence column), or vice versa.

When the AMF receives the new message or the 5GMM Status message as provided above with the new 5GMM cause code, the AMF may re-initiate the NSSAA procedure with the correct S-NSSAI. If the 5GMM cause code indicates that the S-NSSAI is incorrect, then the AMF may re-initiate NSSAA with the correct S-NSSAI optionally by ensuring that the S-NSSAI used is actually part of the pending NSSAI list in the UE, where the latter may also have been received by the AMF.

It may be possible that running NSSAA for an S-NSSAI which is not in the pending NSSAI list is not an error or abnormal case. For example, this can occur for a default S-NSSAI(s) that the UE did not request but the AMF needs to perform NSSAA for. Therefore, an alternative approach would be for the UE to continue processing the related NSSAA message even if the S-NSSAI for which NSSAA is being performed is not in the pending NSSAI (or optionally is in the allowed NSSAI).

Another way to indicate to the UE that the NSSAA procedure is not erroneous it to include a new indication in the network slice-specific authentication command message such that the recipient (e.g., the UE) is informed about the procedure being intentional i.e., is not an error. The indication can be in any form such as defining an operation type where the operation may be set to e.g., "initial NSSAA," "re-authentication," "NSSAA for default slice," etc. This indication can be in the form of a new IE. Note that this indication can be used in general to indicate to the UE why the specific NSSAA message is being sent. The UE can use this indication to identify whether the message being sent is for initial NSSAA or re-run of NSSAA, etc, and hence the UE can take specific actions based on this. For example, if the network is performing re-authentication for a certain S-NSSAI that is in the allowed NSSAI, the UE may block 5GSM requests that are associated with that S-NSSAI given the UE knows that the NSSAA procedure is a re-run and hence the UE does not consider it to be an error.

Currently the involvement of the UE, specifically the 5GMM entity in the UE, for NSSAA is that the NAS forwards the contents of the NETWORK SLICE-SPECIFIC SESSION AUTHENTICATION COMMAND message to the upper layers. However, it may be good for the UE (or NAS or 5GMM entity) to take other actions such as ensuring that the S-NSSAI received in the message is part of any combination of:

the pending NSSAI list;
the allowed NSSAI; or
the rejected NSSAI.

The UE can then take any of the provided action when a condition for the check occurs.

Alternatively, the UE can also check if the S-NSSAI is not part of the allowed NSSAI and also not part of the pending NSSAI, and if so then the UE may consider this an error and take any of the provided actions above.

Note that if the AMF receives a network slice-specific session authentication complete message and the S-NSSAI that is included in the message is not valid e.g., it does not match any of the S-NSSAIs for which NSSAA is ongoing or it is not part of the S-NSSAIs for which NSSAA is being performed, or it is not part of the pending NSSAI list in the AMF, the AMF may ignore or discard the received message and re-transmit the network slice-specific session authentication command message with a valid S-NSSAI (i.e., one for which NSSAA is ongoing or is not yet complete or one that is not the same as what is known to be invalid). Note that this requires that the AMF stores and compares the S-NSSAI sent in the network slice-specific authentication message with the S-NSSAI that is received in the network slice-specific session authentication complete message. When there is no match or when the S-NSSAI received in the network slice-specific session authentication complete message is not part of the S-NSSAI for which NSSAA is ongoing (as described in different ways above), the AMF may ignore the received message or optionally abort the existing procedure and resend the network slice-specific session authentication command message with the desired and valid S-NSSAI.

Note that in this entire document, the term "NSSAA to be performed" is synonymous with receiving the 5GS registration result IE with the "NSSAA to be performed" indicator set to "network slice-specific authentication and authorization is to be performed."

Case 3: Unnecessary Release of a NAS Connection

To ensure that T3540 is started correctly during a registration procedure, in addition to what is specified in section 5.3.1.3 of the NAS specification in [3] for case (b) (i.e., reception of registration accept by the UE), the UE has to also check for the following conditions:

Whether the registration accept message indicates "NSSAA to be performed" in the 5GS registration result IE, or Whether the registration accept message includes a pending NSSAI (i.e., does not include the pending NSSAI IE).

If the registration accept:

indicates "NSSAA to be performed" in the 5GS registration result IE, or includes a pending NSSAI (i.e., does not include the pending NSSAI IE), then the UE may not start T3540.

If T3540 is running in the UE, then upon reception of the network slice-specific authentication command message the UE may stop T3540.

4. Allowing Some Procedures when NSSAA is Ongoing

The UE may be in 5GMM-CONNECTED mode at least over the non-3GPP access, and optionally over the 3GPP access, and the AMF may be performing an NSSAA procedure over the non-3GPP access or optionally over the 3GPP access. The UE may have received a pending NSSAI IE in the registration accept message but no allowed NSSAI IE and the 5GS registration result IE may have indicated "NSSAA to be performed."

While NSSAA is ongoing, the UE may lose its lower layer connection over the non-3GPP access. When the connection is regained, the NAS may receive an indication from the lower layers of non-3GPP access that the access stratum connection is established between UE and network. Although NSSAA is ongoing the UE may send initiate the service request procedure and send the service request message over the non-3GPP access even if NSSAA is ongoing with the conditions above.

The above can also be achieved by enforcing a restriction on the UE regarding the service request procedure such that the UE may not initiate the service request procedure (i.e., may not send the service request message) during an ongoing NSSAA procedure (optionally if the UE has received a pending NSSAI, and has not received an allowed NSSAI, and the 5GS registration result IE indicates "NSSAA to be performed") from 5GMM-CONNECTED mode. Therefore, the restriction does not apply to a UE in 5GMM-IDLE mode. Thus when the UE in 5GMM-IDLE mode over the non-3GPP access receives an indication from the lower layers of non-3GPP access that the access stratum connection is established between UE and network then the UE would be able, and may, send the service request message over the non-3GPP access to establish the NAS connection with the network. The UE may send the service request message even if NSSAA is ongoing over the 3GPP access with the conditions above (regarding what the UE received, or did not receive, in the registration accept message e.g., even if the UE did not receive an allowed NSSAI in the registration accept message). Note that the provided embodiment applies to both initial registration and registration for mobility and periodic updating.

Note that the UE may be allowed to send the service request message in 5GMM-CONNECTED mode if the UE is doing so for the purpose of requesting the establishment of user plane resources for a PDU session for emergency services or for a PDU session for which the UE has exception data reporting to send. Similarly, the UE may be allowed to send data over the control plane (i.e., to send UL NAS transport message with CIoT user data or location services, or optionally SMS) when the UE is doing so for exception data reporting or if the UE is a high priority access UE.

Alternatively, when the NAS receives an indication from the lower layers of non-3GPP access that the access stratum connection is established between UE and network, the UE may send a registration request message instead of a service request procedure. The UE may include the requested NSSAI IE, or the requested mapped NSSAI IE, or both, if the UE had included one or both of these IEs during the last registration procedure (or if the UE has slice information for the current PLMN) even if the S-NSSAIs are included in the current pending NSSAI list in the UE.

Note that provided embodiments above can also apply during any other procedure and are not limited to the registration procedure. For example, if in the future the configuration update command message can be used to provide the UE with a pending NSSAI and optionally no allowed NSSAI, and optionally based on the contents of the message the UE considers that it has no valid allowed NSSAI, then if the lower layer connection fails and later gets established (as described above), the provided embodiments above would still apply. Hence the provided embodiments are not limited to the registration procedure only and may apply during any procedure or at any time in connected mode at which the UE determines that it has no allowed NSSAI.

The NAS specification [3] already allows the UE to initiate a 5GSM procedure e.g., PDU session establishment procedure, during NSSAA when the conditions above are met (i.e., the UE received a pending NSSAI IE in the registration accept message but no allowed NSSAI IE and the 5GS registration result IE may have indicated "NSSAA to be performed"). However, if the UE does send a PDU Session Establishment request message (in the UL NAS TRANSPORT message) then the UE may not include the S-NSSAI IE in the UL NAS TRASNPORT message since the UE does not have an allowed NSSAI yet. Alternatively, the UE may include the S-NSSAI IE and set it to a pre-configured value in the UE.

5. Recovery from Fallback During NSSAA

As explained above, the UE may receive a fallback indication during NSSAA and hence the UE has a pending NAS procedure (e.g., the UE may need to send a NAS message in response to the network slice-specific authentication command message). When the fallback occurs, the UE can take any of the following measures as a provided embodiment to recover from fallback:

The UE may be allowed to initiate a service request procedure (i.e., send a service request message) to recover from fallback as currently specified. To allow this, the current restriction that the service request procedure may not be allowed during NSSAA needs to be updated such that more exceptions are defined to solve this problem. For example, the restriction (prohibiting the UE from initiating a service request procedure during NSSAA) may not apply to the service request procedure that is being initiated from 5GMM-IDLE mode. Thus, the UE with a pending NSSAI and during an NSSAA procedure (optionally if the UE does not have an allowed NSSAI, or if the UE received the "NSSAA to be performed indicator" indicating that NSSAA is to be performed) may be allowed to send a service request message from 5GMM-IDLE mode to recover from fallback.

Optionally the above may be allowed only if the UE has already registered to the system, or if the NSSAA is being performed following a registration procedure with the 5GS registration type IE set to "mobility registration updating" or "periodic registration updating."

Optionally, when sending the service request message the UE may not include the Uplink data status IE unless if the corresponding PDU session (for which a particular bit is set to one in the IE) is associated with an S-NSSAI that is in the allowed NSSAI, or associated with an S-NSSAI for which NSSAA is not ongoing, or the PDU session is an always on PDU session, or if the PDU session had user plane resources established prior to the fallback indication Alternatively, if in order to recover from the fallback, the UE may send the registration request message with the 5GS registration type IE set to "mobility registration updating." The UE is allowed to include the requested NSSAI IE or the requested mapped NSSAI IE in the registration request that is transmitted to recover from fallback even if the entries are in the pending NSSAI or even if the UE has a pending NSSAI.

Note that the provided embodiment above may also apply at any time when the UE is in connected mode and NSSAA is ongoing and the UE receives a fallback indication. Hence, the provided UE behaviour is not restricted to the scenario occurring only during a registration procedure. The provided embodiments still apply if other procedures are ongoing or in general for a UE that is connected mode.

Optionally, when sending the service request message the UE may not include the Uplink data status IE unless if the corresponding PDU session (for which a particular bit is set to one in the IE) is associated with an S-NSSAI that is in the allowed NSSAI, or associated with an S-NSSAI for which NSSAA is not ongoing, or the PDU session is an always on PDU session.

When the AMF receives either the service request message or the registration request message as provided above, and the AMF has an ongoing NSSAA procedure, the AMF may process the service request message or registration request message and optionally abort the NSSAA procedure. The AMF may determine to do so based on the fact that the NAS message is received as an initial NAS message from the N2 interface and protocol that runs between the NG-RAN and the AMF.

6. Stopping of Timer T3346 when the UE Receives a NAS Message for NSSAA

It is provided that the UE may stop T3346, if running, upon the reception of a network slice-specific authentication command message. Hence, upon reception of a NETWORK SLICE-SPECIFIC AUTHENTICATION COMMAND message, the UE may stop the timer T3346 if running.

7. Solution for Considering the Type of Registration Update for NSSAA

It is provided that the current handling of NSSAA be performed only when the 5GS registration type IE indicates "mobility registration updating" in the registration request message optionally when the NAS message is received from a UE that is not in narrow band-N1 (NB-N1) mode. Therefore, the AMF may take the actions that are currently specified in TS 24.501 if the 5GS registration type IE indicates "mobility registration updating" in the registration request message optionally when the NAS message is received from a UE that is not in NB-N1 mode.

The AMF may have new NSSAI information for the UE i.e., the allowed NSSAI that was previously sent to the UE may have changed. The new NSSAI that the UE can use may also require NSSAA to be performed. In fact the AMF may be required, due to internal policy or as requested by the NSSAA related AAA server, to re-initiate NSSAA for the UE. The UE may then send a registration request with the 5GS registration type IE indicating "periodic registration updating," or "mobility registration updating" for the UE that is in NB-N1 mode. The following is therefore provided:

The AMF need not take any actions if the allowed NSSAI has not changed for the UE and NSSAA is not required to be re-initiated for the UE; and If the allowed NSSAI (or S-NSSAIs that the UE is allowed to use) has changed, and at least one of the new S-NSSAIs requires NSSAA, the AMF may:

Send the allowed NSSAI to the UE where the allowed NSSAI contains the S-NSSAIs for which re-initiation of NSSAA is not required, if any, or Send the pending NSSAI containing the S-NSSAIs for which NSSAA needs to be re-initiated. Additionally, if no allowed NSSAI can be provided to the UE, the AMF may also set the "NSSAA to be performed" indicator in the 5GS registration result IE. The contents of the pending NSSAI may also include the default slices (i.e., the slices that are marked as default slices in the subscription information of the UE and that require NSSAA to be initiated or re-initiated).

During a periodic registration procedure (i.e., the 5GS registration type IE indicates "periodic registration updating"), or during a registration procedure for which the 5GS registration type IE is set to "mobility registration updating," the UE may receive a pending NSSAI in the registration accept message. The UE behaves in the similar manner as is currently specified when the same information is received in a registration accept message as part of a registration procedure that is not triggered for periodic updating.

If the 5GS registration result IE indicates "NSSAA to be performed" in registration accept message, and the 5GS registration type IE in the registration request message indicated:

a) "periodic registration updating" (i.e., the procedure was triggered due to periodic registration update); or b) "mobility registration updating" and the UE is in NB-N1 mode (i.e., the procedure was not triggered by the NB-N1 mode UE for periodic registration update), the UE may consider the previous stored allowed NSSAI as invalid i.e., the UE may delete any stored allowed NSSAI.

Note that the provided embodiment above i.e., to consider the stored allowed NSSAI as invalid can alternatively also apply to all UEs that send a registration request message with 5GS registration type IE set to "mobility registration updating" and the UE then gets the 5GS registration result IE indicating "NSSAA to be performed" in registration accept message.

It may be noted that in the entire document, the term "NSSAA to be performed" is synonymous with the "NSSAA to be performed indicator" that is set to the value "network slice-specific authentication and authorization is to be performed."

Note that the AMF can also reject the UE's registration request message, for which the 5GS registration type IE indicates "periodic registration updating" (i.e., the procedure was triggered due to periodic registration update) or indicates "mobility registration updating" and the UE is in NB-N1 mode (i.e., the procedure was not triggered by the NB-N1 mode UE for periodic registration update) if NSSAA is revoked for all the slices although the UE did not send the requested NSSAI IE (or the requested mapped NSSAI IE) in the registration request message. The AMF takes the same behaviour as has been provided earlier in this document (for the case when the AMF needs to consider the requested mapped NSSAI IE and/or the requested NSSAI IE).

Certain examples of the present disclosure provide a method, for a network entity (e.g., an AMF entity), the method comprising: if an allowed NSSAI for a UE has changed from an allowed NSSAI that was previously sent to the UE, and at least one new S-NSSAI requires NSSAA, sending, to the UE: an allowed NSSAI containing S-NSSAIs for which a re-initiation of NSSAA is not required, and/or a pending NSSAI containing S-NSSAIs for which NSSAA needs to be re-initiated. The skilled person will appreciate that this technique may be applied to the cases described above under item 7 (i.e., the UE is performing periodic update, or the NB-N1 mode UE is sending registration request for mobility updating). In either case, the AMF does not receive a requested NSSAI and hence certain examples send: (a) an allowed NSSAI with slices that are allowed to use, (b) pending NSSAI if NSSAA is requires for some (potentially new) slices.

Certain examples of the present disclosure provide a method, for a network entity (e.g., an AMF entity), the method comprising: if an allowed NSSAI for a UE has changed from an allowed NSSAI that was previously sent to the UE, and at least one new S-NSSAI requires NSSAA, sending, to the UE: an allowed NSSAI containing S-NSSAIs for which a re-initiation of NSSAA is not required, and/or a pending NSSAI containing S-NSSAIs for which NSSAA needs to be re-initiated. The skilled person will appreciate that this technique may be generalised to all types of registration requests for which the UE may set the allowed NSSAI as invalid if "NSSAA to be performed" is received.

FIG. 6 is a block diagram of an exemplary network entity that may be used in examples of the present disclosure. For example, the UE and/or AMF may be provided in the form of the network entity illustrated in FIG. 6. The skilled person will appreciate that the network entity illustrated in FIG. 6 may be implemented, for example, as a network element on a dedicated hardware, as a software instance running on a dedicated hardware, or as a virtualised function instantiated on an appropriate platform, e.g., on a cloud infrastructure.

The entity 600 comprises a processor (or controller) 601, a transmitter 603 and a receiver 605. The receiver 605 is configured for receiving one or more messages or signals from one or more other network entities. The transmitter 603 is configured for transmitting one or more messages or signals to one or more other network entities. The processor 601 is configured for performing one or more operations and/or functions as described above. For example, the processor 601 may be configured for performing the operations of a UE or AMF.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provides a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

Although the present disclosure has been described with various embodiments, various changes and modifications may be suggested to one skilled in the art. It is intended that the present disclosure encompass such changes and modifications as fall within the scope of the appended claim.

What is claimed is:

1. A method of a user equipment (UE), the method comprising:
    transmitting, by the UE to a network entity, a registration request message including a registration type information indicating a periodic registration updating or a mobility registration updating;
    receiving, by the UE from the network entity, a registration accept message including a pending network slice selection assistant information (NSSAI) and a registration result information with an indicator indicating a network slice-specific authentication and authorization (NSSAA) is to be performed;
    identifying, by the UE, that a previously received allowed NSSAI as invalid based on the registration accept message; and
    initiating, by the UE, a service request procedure in case that the UE in an idle mode obtains an indication that an access stratum connection is established between the UE and the network entity.

2. The method according to claim 1, wherein the registration accept message does not include an allowed NSSAI.

3. The method according to claim 1, wherein the UE in the idle mode over a non-third generation protocol project (3GPP) access obtains the indication that the access stratum connection is established between the UE and the network entity from lower layers of the non-3GPP access.

4. The method according to claim 1, further comprising:
    initiating, by the UE, the service request procedure in case that the registration accept message does not include an allowed NSSAI and the UE in a connected mode obtains a fallback indication and the UE has a pending procedure.

5. The method according to claim 4, wherein the pending procedure is a network slice-specific authentication and authorization (NSSAA) procedure.

6. The method according to claim 1, wherein the UE is in a narrow band mode allowing access to a five generation (5G) network in case that the registration type information indicates the mobility registration updating.

7. A method of a network entity, the method comprising:
    receiving, by the network entity from a user equipment (UE), a registration request message including a registration type information indicating a periodic registration updating or a mobility registration updating; and
    transmitting, by the network entity to the UE, a registration accept message to indicate, to the UE, that a previously transmitted allowed network slice selection assistant information (NSSAI) is invalid, the registration accept message including a pending NSSAI and a registration result information with an indicator indicating a network slice-specific authentication and authorization (NSSAA) is to be performed, wherein a service request procedure is initiated in case that an access stratum connection is established between the UE and the network entity.

8. The method according to claim 7, wherein the registration accept message does not include an allowed NSSAI.

9. The method according to claim 7, wherein the UE in an idle mode over a non-third generation protocol project (3GPP) access obtains the indication that the access stratum connection is established between the UE and the network entity from lower layers of the non-3GPP access.

10. The method according to claim 7, wherein the service request procedure is initiated in case that the registration accept message does not include an allowed NSSAI and the UE in a connected mode obtains a fallback indication and the UE has a pending procedure,
wherein the pending procedure is a network slice-specific authentication and authorization (NSSAA) procedure.

11. A user equipment (UE), the UE comprising:
a transceiver; and
at least one processor configured to control the transceiver to:
transmit, to a network entity, a registration request message including a registration type information indicating a periodic registration updating or a mobility registration updating,
receive, from the network entity, a registration accept message including a pending network slice selection assistant information (NSSAI) and a registration result information with an indicator indicating a network slice-specific authentication and authorization (NSSAA) is to be performed,
identify that a previously received allowed NSSAI as invalid based on the registration accept message, and
initiate a service request procedure in case that the UE in an idle mode obtains an indication that an access stratum connection is established between the UE and the network entity.

12. The UE according to claim 11, wherein the registration accept message does not include an allowed NSSAI.

13. The UE according to claim 11, wherein the UE in the idle mode over a non-third generation protocol project (3GPP) access obtains the indication that the access stratum connection is established between the UE and the network entity from lower layers of the non-3GPP access.

14. The UE according to claim 11,
wherein the processor is further configured to initiate the service request procedure in case that the registration accept message does not include an allowed NSSAI and the UE in a connected mode obtains a fallback indication and the UE has a pending procedure.

15. The UE according to claim 14, wherein the pending procedure is a network slice-specific authentication and authorization (NS SAA) procedure.

16. The UE according to claim 11, wherein the UE is in a narrow band mode allowing access to a five generation (5G) network in case that the registration type information indicates the mobility registration updating.

17. A network entity, the network entity comprising: a transceiver; and at least one processor configured to control the transceiver to: receive, from a user equipment (UE), a registration request message including a registration type information indicating a periodic registration updating or a mobility registration updating; and transmit, to the UE, a registration accept message to indicate, to the UE, that a previously transmitted allowed network slice selection assistant information (NSSAI) is invalid, the registration accept message including a pending NSSAI and a registration result information with an indicator indicating a network slice-specific authentication and authorization (NSSAA) is to be performed, wherein a service request procedure is initiated in case that an access stratum connection is established between the UE and the network entity.

18. The network entity according to claim 17, wherein the registration accept message does not include an allowed NSSAI.

19. The network entity according to claim 17, wherein the UE in an idle mode over a non-third generation protocol project (3GPP) access obtains the indication that an access stratum connection is established between the UE and the network entity from lower layers of the non-3GPP access.

20. The network entity according to claim 17, wherein the service request procedure is initiated in case that the registration accept message does not include an allowed NSSAI and the UE in a connected mode obtains a fallback indication and the UE has a pending procedure,
wherein the pending procedure is a network slice-specific authentication and authorization (NSSAA) procedure.

* * * * *